United States Patent
Lim et al.

(10) Patent No.: US 11,456,450 B2
(45) Date of Patent: Sep. 27, 2022

(54) METHOD AND APPARATUS FOR EVALUATING PHASE STABILITY OF ELECTRODE MIXTURE SLURRY

(71) Applicant: LG CHEM, LTD., Seoul (KR)

(72) Inventors: Ga-Hyun Lim, Daejeon (KR); Jin-Young Son, Daejeon (KR); Hwi-Soo Yang, Daejeon (KR); Jong-Heon Seol, Daejeon (KR); Hyung-Suk Cho, Daejeon (KR); Sang-Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 138 days.

(21) Appl. No.: 16/629,226

(22) PCT Filed: Feb. 22, 2019

(86) PCT No.: PCT/KR2019/002212
§ 371 (c)(1),
(2) Date: Jan. 7, 2020

(87) PCT Pub. No.: WO2019/164336
PCT Pub. Date: Aug. 29, 2019

(65) Prior Publication Data
US 2020/0212430 A1 Jul. 2, 2020

(30) Foreign Application Priority Data
Feb. 23, 2018 (KR) .................. 10-2018-0021854

(51) Int. Cl.
G01N 11/16 (2006.01)
H01M 4/139 (2010.01)
G01N 11/04 (2006.01)

(52) U.S. Cl.
CPC ............ *H01M 4/139* (2013.01); *G01N 11/04* (2013.01); *G01N 11/162* (2013.01)

(58) Field of Classification Search
CPC ..... H01M 4/139; G01N 11/04; G01N 11/162; G01N 1/162
(Continued)

(56) References Cited

U.S. PATENT DOCUMENTS 10,263,410 B2  4/2019  Fukumoto et al.
2006/0266736 A1  11/2006  Tregub et al.
(Continued)

FOREIGN PATENT DOCUMENTS

CA    3 098 761 A1    5/2015
CN    104880384 A     9/2015
(Continued)

OTHER PUBLICATIONS

Bitsch et al., "A novel slurry concept for the fabrication of lithium-ion battery electrodes with beneficial properties," journal of Power Sources, vol. 265, 2014, pp. 81-90.
(Continued)

*Primary Examiner* — Robert R Raevis
(74) *Attorney, Agent, or Firm* — Birch, Stewart, Kolasch & Birch, LLP

(57) ABSTRACT

A method for evaluating phase stability of an electrode mixture slurry, including the steps of: (S1) introducing the electrode mixture slurry to a rheometer; (S2) applying a first shear rate to the electrode mixture slurry; (S3) applying a second shear rate after applying the first shear rate to the electrode mixture slurry, wherein the second shear rate is higher than the first shear rate; (S4) applying a third shear rate after applying the second shear rate to the electrode mixture slurry, wherein the third shear rate is lower than the second shear rate; and (S5) comparing the shear viscosity at
(Continued)

the first shear rate with the shear viscosity at the third shear rate. An apparatus for evaluating phase stability of the electrode mixture slurry is also provided.

10 Claims, 5 Drawing Sheets

(58) Field of Classification Search
USPC .......... 73/53.01, 54.01, 54.28–54.35, 61.41, 73/64.42, 61.44, 61.73, 866; 429/204
See application file for complete search history.

(56) References Cited

U.S. PATENT DOCUMENTS

2015/0307730 A1* 10/2015 Hersam ................. C09D 11/52 430/308
2018/0306694 A1   10/2018 Park et al.

FOREIGN PATENT DOCUMENTS

| | | |
|---|---|---|
| CN | 105738827 A | 7/2016 |
| CN | 105758766 A | 7/2016 |
| CN | 107271327 A | 10/2017 |
| CN | 107635762 A | 1/2018 |
| JP | 2010-44871 A | 2/2010 |
| JP | 2014-32904 A | 2/2014 |
| JP | 2014-102967 A | 6/2014 |
| JP | 2016-39082 A | 3/2016 |
| KR | 10-1336156 B1 | 12/2013 |
| KR | 10-2015-0060908 A | 6/2015 |
| KR | 10-2017-0065175 A | 6/2017 |
| KR | 10-2017-0112184 A | 10/2017 |
| KR | 10-2017-0113791 A | 10/2017 |
| RU | 2015 145 937 A | 5/2017 |
| WO | WO 2013/164587 A1 | 11/2013 |

OTHER PUBLICATIONS

International Search Report (PCT/ISA/210) issued in PCT/KR2019/002212, dated May 27, 2019.

* cited by examiner

METHOD AND APPARATUS FOR EVALUATING PHASE STABILITY OF ELECTRODE MIXTURE SLURRY

TECHNICAL FIELD

The present disclosure relates to a method and apparatus for evaluating phase stability of electrode mixture slurry.

The present application claims priority to Korean Patent Application No. 10-2018-0021854 filed on Feb. 23, 2018 in the Republic of Korea, the disclosures of which including the specification and drawings are incorporated herein by reference.

BACKGROUND ART

In general, an electrode for a secondary battery includes a current collector and an electrode active material layer formed on the current collector. Such an electrode active material layer is obtained by dissolving or dispersing an electrode active material, binder, conductive material and other additives in a predetermined solvent or dispersion medium to form electrode mixture slurry (including a paste or ink form), and transferring and coating the electrode mixture slurry onto a current collector, followed by drying.

A transfer tube through which the electrode mixture slurry is transferred is provided with a transfer filter and a coating line is provided with a circulation filter to remove materials or granules not dissolved in the negative electrode mixture slurry, thereby reducing coating defects ultimately. However, when the electrode mixture slurry passes through the filter provided in the transfer tube, strong shear is applied to the electrode mixture slurry by the filter. Herein, when the electrode mixture slurry has poor phase stability, for example, when the slurry has low dispersibility or shows local particle aggregation, the slurry undergoes a change in physical properties, such as an increase in slurry viscosity or a change in elasticity or internal material structure of slurry, resulting in blocking of the filter. Such filter blocking is followed by coating defects, thereby causing degradation of processability and productivity. Particularly, the above-mentioned problem becomes severe, when a carbonaceous material is used as an active material and/or a conductive material for a negative electrode mixture slurry.

Under these circumstances, there has been used a method for predicting filter blocking and phase stability according to the related art in order to predict phase stability of electrode mixture slurry, particularly negative electrode mixture slurry. For example, the method includes applying a predetermined number range of shear rates, such as a shear rate of 1/s, to electrode mixture slurry and measuring the viscosity of the electrode mixture slurry at that time by using a rheometer.

For example, the electrode mixture slurry obtained from each of Preparation Examples 1 and 2 described hereinafter was introduced to a rheometer system in order to determine the physical properties of the electrode mixture slurry and the viscosity was measured, while increasing the shear rate within a predetermined range (the first cycle), and then the same procedure was repeated for the second cycle and the third cycle. Then, the viscosity values obtained therefrom were depicted in graphs (FIG. 2a and FIG. 2b).

Referring to FIG. 2a, even when the shear cycle is repeated, the viscosity graph obtained from each cycle shows no significant difference. It is thought that this is because the electrode mixture slurry has high phase stability, and thus undergoes no significant change in physical properties of electrode mixture slurry even after the shear application. Meanwhile, referring to FIG. 2b, as the shear cycle is repeated, the viscosity of negative electrode mixture slurry tends to be decreased. It is thought that this is because the electrode mixture slurry has low phase stability, and thus undergoes a change in physical properties of electrode mixture slurry after the shear application.

The above-mentioned method for evaluating phase stability of electrode mixture slurry by repeating shear cycles many times within a predetermined range of shear rates requires about 18 minutes per cycle. Thus, when carrying out 3 cycles, the method requires about 1 hour, which requires undesired information collection and time consumption in determining and analyzing physical properties of negative electrode mixture slurry.

Moreover, the inventors of the present disclosure have found that when electrode mixture slurry passes through a transfer tube provided with a filter as shown in FIG. 3 schematically, the electrode mixture slurry shows a rapid change in shear at the point of the filter as shown in FIG. 3 in the course of passing through the transfer tube, but such a rapid change in shear is not applied to the conventional rheological evaluation.

DISCLOSURE

Technical Problem

The present disclosure is directed to providing a method and apparatus for evaluating phase stability of electrode mixture slurry, particularly negative electrode mixture slurry, within a decreased time.

The present disclosure is also directed to providing a method and apparatus for evaluating phase stability of electrode mixture slurry by simulating a shear condition applied upon transferring and/or coating in an actual processing line more similarly.

Technical Solution

According to the first embodiment of the present disclosure, there is provided a method for evaluating phase stability of an electrode mixture slurry, including the steps of: (S1) introducing the electrode mixture slurry to a rheometer; (S2) applying a first shear rate to the electrode mixture slurry; (S3) applying a second shear rate after applying the first shear rate to the electrode mixture slurry, wherein the second shear rate is higher than the first shear rate; (S4) applying a third shear rate after applying the second shear rate to the electrode mixture slurry, wherein the third shear rate is equal to the first shear rate; and (S5) comparing the shear viscosity at the first shear rate with the shear viscosity at the third shear rate.

According to the second embodiment of the present disclosure, there is provided the method for evaluating phase stability of the electrode mixture slurry as defined in the first embodiment, which further includes at least one step of further applying a fourth shear rate that is higher than the third shear rate to the electrode mixture slurry after applying the third shear rate.

According to the third embodiment of the present disclosure, there is provided the method for evaluating phase stability of the electrode mixture slurry as defined in the second embodiment, wherein the step of further applying the fourth shear rate is carried out at least twice, and the method further includes a step of applying the same shear rate as the first shear rate between the steps of further applying the fourth shear rate.

According to the fourth embodiment of the present disclosure, there is provided the method for evaluating phase stability of the electrode mixture slurry as defined in any one of the first to the third embodiments, wherein each of the first shear rate and the third shear rate is about 0.1/s.

According to the fifth embodiment of the present disclosure, there is provided the method for evaluating phase stability of the electrode mixture slurry as defined in any one of the second to the fourth embodiments, wherein the fourth shear rate is about 10 times or more higher than the second shear rate.

According to the sixth embodiment of the present disclosure, there is provided the method for evaluating phase stability of the electrode mixture slurry as defined in any one of the first to the fifth embodiments, wherein the rheometer is a rotational rheometer.

According to the seventh embodiment of the present disclosure, there is provided the method for evaluating phase stability of the electrode mixture slurry as defined in any one of the first to the sixth embodiments, wherein the step of introducing the electrode mixture slurry is carried out by introducing 10 mL of electrode mixture slurry.

According to the eighth embodiment of the present disclosure, there is provided the method for evaluating phase stability of the electrode mixture slurry as defined in any one of the first to the seventh embodiments, wherein the retention time of each of the step of applying the first shear rate, the step of applying the second shear rate, the step of applying the third shear rate and the step of applying the fourth shear rate is 180 seconds to 260 seconds.

According to the ninth embodiment of the present disclosure, there is provided the method for evaluating phase stability of the electrode mixture slurry as defined in any one of the first to the eighth embodiments, wherein the instantaneous rate of change in shear rate of each of from the step of applying the first shear rate to the step of applying the second shear rate, from the step of applying the second shear rate to the step of applying the third shear rate, or from the step of applying the third shear rate to the step of applying the fourth shear rate has an absolute value of $100/s^2$ or more.

According to the tenth embodiment of the present disclosure, there is provided the method for evaluating phase stability of the electrode mixture slurry as defined in any one of the first to the ninth embodiments, which further includes a step of evaluating the electrode mixture slurry as having phase stability, when the shear viscosity after carrying out the step of applying the third shear rate is within ±20% of the shear viscosity after carrying out the step of applying the first shear rate, as a result of the comparison of shear viscosity in the step of comparing shear viscosities.

According to the eleventh embodiment of the present disclosure, there is also provided an apparatus for evaluating phase stability of the electrode mixture slurry, including: an input module configured to introduce the electrode mixture slurry to a rheometer; a shear rate applying module configured to apply a first shear rate, a second shear rate and a third shear rate to the electrode mixture slurry; a rate-controlling module configured to control the first shear rate, the second shear rate and the third shear rate when applying the second shear rate may be carried out after carrying out the step of applying the first shear rate, wherein the second shear rate is higher than the first shear rate, and a step of applying the third shear rate may be carried out after carrying out a step of applying the second shear rate, wherein the third shear rate is equal to the first shear rate; a comparing module configured to compare the shear viscosity at the first shear rate with the shear viscosity at the third shear rate; and an evaluating module configured to evaluate the electrode mixture slurry as having phase stability, when the shear viscosity after carrying out the step of applying the third shear rate is within ±20% of the shear viscosity after carrying out the step of applying the first shear rate.

Advantageous Effects

According to the present disclosure, it is possible to evaluate phase stability of electrode mixture slurry, particularly negative electrode mixture slurry, within a decreased period of time by simulating a shear condition applied upon transferring and/or coating in an actual processing line and measuring shear viscosity of the electrode mixture slurry at that time.

In addition, since only the test data required for evaluating phase stability of electrode mixture slurry are obtained, there is no need for analyzing undesired test results generated from the conventional method.

Further, it is possible to evaluate phase stability of electrode mixture slurry more accurately by simulating a condition closer to the condition of an actual transfer tube or coating line.

DESCRIPTION OF DRAWINGS

The accompanying drawings illustrate a preferred embodiment of the present disclosure and together with the following disclosure, serve to provide further understanding of the technical features of the present disclosure, and thus, the present disclosure is not construed as being limited to the drawing. Further, a shape, a size, a scale or a ratio of components might be exaggerated for easier explanation.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one part is connected to another part' covers not only 'a part is directly connected to another part' but also 'one part is connected electrically to another part' by way of the other element interposed between them.

Throughout the specification, the expression 'a part [includes] an element' does not preclude the presence of any additional elements otherwise explicitly recited but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Figure 1:
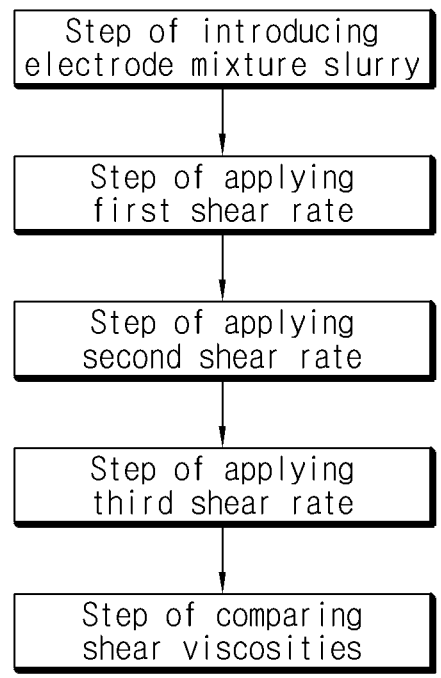
FIG. 1 is a flow chart illustrating the method for evaluating phase stability of electrode mixture slurry according to the present disclosure.

In one aspect of the present disclosure, there is provided a method for evaluating phase stability of electrode mixture slurry by simulating the shear rate applied to the electrode mixture slurry when it flows through a transfer tube and the shear rate applied to the electrode mixture slurry when it passes through a filter. As shown in the flow chart of FIG. 1, the method for evaluating phase stability of electrode mixture slurry includes the steps of: introducing electrode mixture slurry to a rheometer; applying a first shear rate to the electrode mixture slurry; applying a second shear rate after applying the first shear rate, wherein the second shear rate is higher than the first shear rate; applying a third shear rate after applying the second shear rate, wherein the third shear rate is equal to the first shear rate; and comparing the shear viscosity at the first shear rate with the shear viscosity at the third shear rate.

According to an embodiment of the present disclosure, when simulating the flow of the electrode mixture slurry through a transfer tube, it is understood that the simulation is an embodiment wherein the minimum volume of 7.53 L of electrode mixture slurry flows through a transfer tube having a circular section with a diameter of 2.5 inches. According to an embodiment of the present disclosure, the electrode mixture slurry is introduced to the input module of a rheometer in an apparatus for evaluating phase stability of electrode mixture slurry in order to simulate the embodiment. According to an embodiment of the present disclosure, the volume of electrode mixture slurry introduced to the input module of a rheometer is 10 mL.

Next, the first shear rate is applied to the electrode mixture slurry. The first shear rate is set to a specific value by simulating the shear rate applied to the electrode mixture slurry when it flows through a transfer tube.

As used herein, the expression 'is set to a specific value' is intended to differentiate from the conventional embodiment wherein the shear rate applied to the electrode mixture slurry is changed with the lapse of time within a predetermined range.

After applying the first shear rate, the second shear rate is applied, wherein the second shear rate is higher than the first shear rate. The second shear rate is set to a specific value by simulating the shear rate ($V_f$) applied to the electrode mixture slurry when it passes through a filter.

After applying the second shear rate, the third shear rate is applied, wherein the third shear rate may be lower than the second shear rate. According to an embodiment of the present disclosure, the third shear rate may be substantially the same as the first shear rate.

According to an embodiment of the present disclosure, the method may further include a step of further applying a shear rate, wherein a shear rate simulating the shear rate applied to the electrode mixture slurry when it passes through a filter is applied. In other words, after applying the third shear rate, the method may further include at least one step of further applying a shear rate, wherein a shear rate higher than the second shear rate is applied. In addition, the step of further applying a shear rate may be carried out at least twice, and the method may further include a step of applying a shear rate (e.g. the same shear rate as the first shear rate) lower than the second shear rate between the steps of further applying a shear rate. For example, it is possible to carry out at least two steps of simulating the shear rate applied to the electrode mixture slurry when it passes through a filter. Herein, the shear rate in each step may be set to $V_{f1}, V_{f2}, V_{f3}, \ldots V_{fy+1}$ (y is a natural number of 1 or more), and the shear rates $V_{f1}, V_{f2}, V_{f3}, \ldots V_{fy+1}$ may satisfy the relationship of $V_{f1} < V_{f2} < V_{f3} < \ldots < V_{fy+1}$. $V_{fy+1}$ may have a shear rate value at least 10 times or more higher than $V_{fy}$. For example, $V_{f2}$ may be set to have a shear rate 10 times or more higher than $V_{f1}$, $V_{f3}$ may be set to have a shear rate 10 times or more higher than $V_{f2}$, and $V_{fy+1}$ may be set to have a shear rate 10 times or more higher than $V_{fy}$.

Figure 2A:
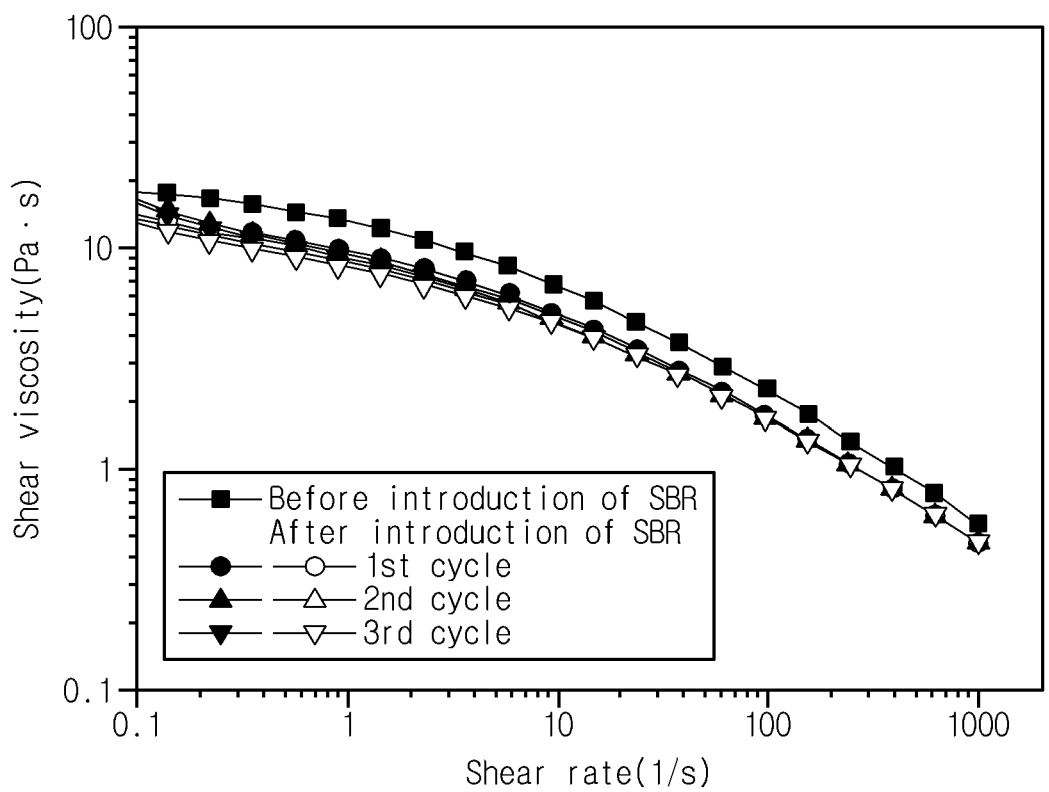
FIG. 2a and FIG. 2b are graphs illustrating the shear rate vs. shear viscosity of negative electrode mixture slurry determined by using a rheometer according to the related art.
Figure 2B:
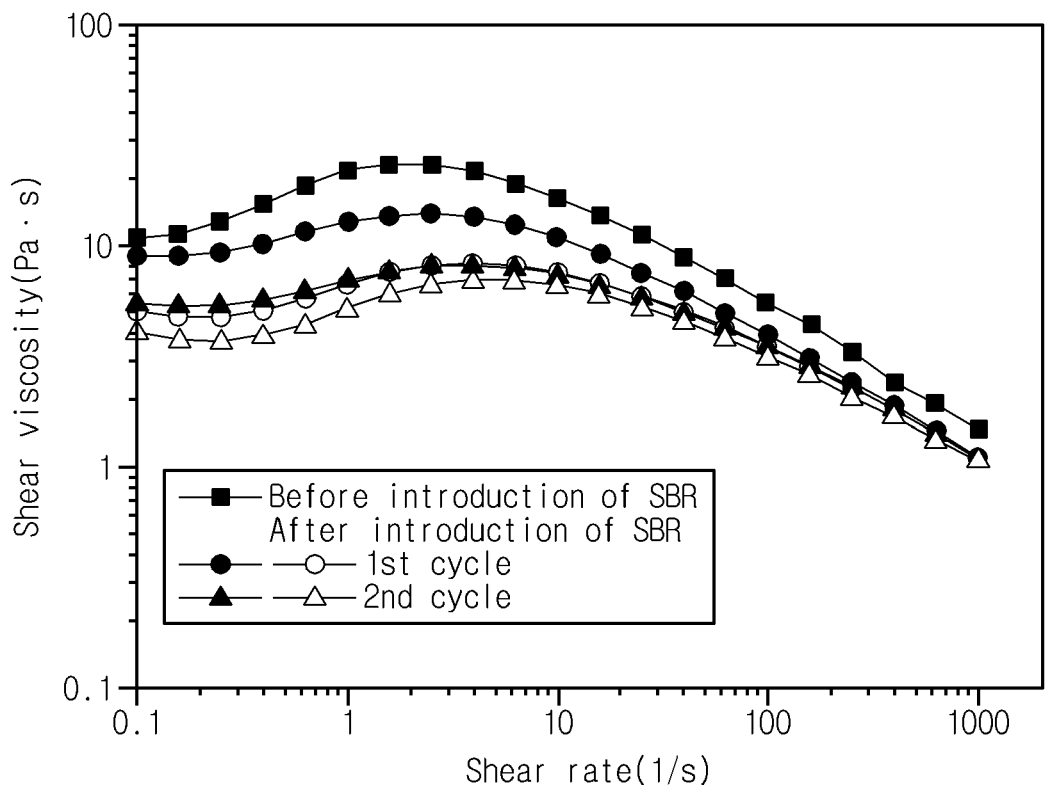
Figure 3:
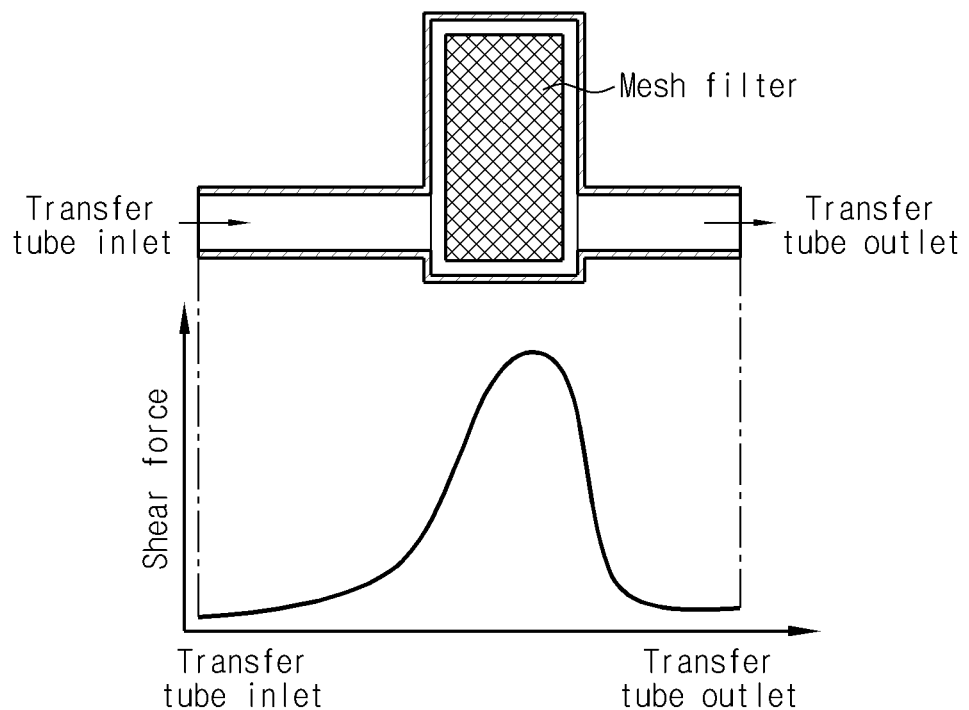
FIG. 3 shows an embodiment of a transfer tube provided with a filter, through which electrode mixture slurry is transferred in an actual process, and a graph illustrating the shear applied to the electrode mixture slurry while it passes through the transfer tube.

Preferably, a change in shear rate from the step of applying the first shear rate to the step of applying the second shear rate, a change in shear rate from the step of applying the second shear rate to the step of applying the third shear rate, or a change in shear rate from the step of applying the third shear rate to the step of further applying a shear rate is made instantaneously. Herein, 'instantaneously' is used to clearly differentiate such a change in shear rate from a gradually change in shear rate according to the related art. Herein, there is no consideration about the inertia of the slurry itself caused by the shear rate applied in the preceding step and the limitation of the mechanical system itself, such as a rheometer. According to a non-limiting embodiment, the instantaneous rate of change in shear rate from the step of applying the first shear rate to the step of applying the second shear rate, from the step of applying the second shear rate to the step of applying the third shear rate, or from the step of applying the third shear rate to the step of further applying a shear rate has an absolute value of $100/s^2$ or more. When the shear rate is changed with the lapse of time as shown in FIG. 2a and FIG. 2b, it is not possible to evaluate whether the viscosity of electrode mixture slurry is recovered or not after a rapid change in shear rate, and thus to evaluate phase stability of slurry.

The retention time of each of the step of applying the first shear rate, the step of applying the second shear rate, the step of applying the third shear rate and the step of further applying a shear rate may be determined by considering a filter to be simulated, structure of a transfer tube, or the like. For example, the retention time of each of the step of applying the first shear rate, the step of applying the second shear rate, the step of applying the third shear rate and the step of further applying a shear rate may be 180-260 seconds.

Then, the shear viscosity at the first shear rate is compared with the shear viscosity at the third shear rate.

As used herein, 'shear viscosity' may be obtained by setting the interval between circular rotational disks of a rheometer to a predetermined value at 23° C., introducing electrode mixture slurry in an amount corresponding to the volume with which the interval is filled, and setting a shear rate range at a frequency of 1 Hz to measure the force generated upon the rotation of the rotational disks. The shear rate may be $10^{-3}$ to $10^3$ (l/s), but is not limited thereto.

According to a preferred embodiment of the present disclosure, after setting the interval between circular rotational disks of a rheometer to a predetermined value, 10 mL of negative electrode mixture slurry corresponding to the volume with which the interval is filled is introduced, a shear rate is set to a range of $10^{-1}$ to $10^3$ (l/s) at a frequency of 1 Hz, a shear rate is applied so that it may be changed according to 0.1/s 10/s→0.1/s→100/s→0.1/s→1,000/s, and the retention time of each shear rate is set to 180-260 seconds to measure the shear viscosity.

Then, the shear viscosity at the first shear rate is compared with the shear viscosity at the third shear rate. In addition, when the shear viscosity after carrying out the step of applying the third shear rate is within ±20% or within ±10% of the shear viscosity after carrying out the step of applying the first shear rate, as a result of the comparison of shear viscosity, it can be understood that the shear viscosity at the first shear rate is recovered and the electrode mixture slurry has phase stability.

Figure 4A:
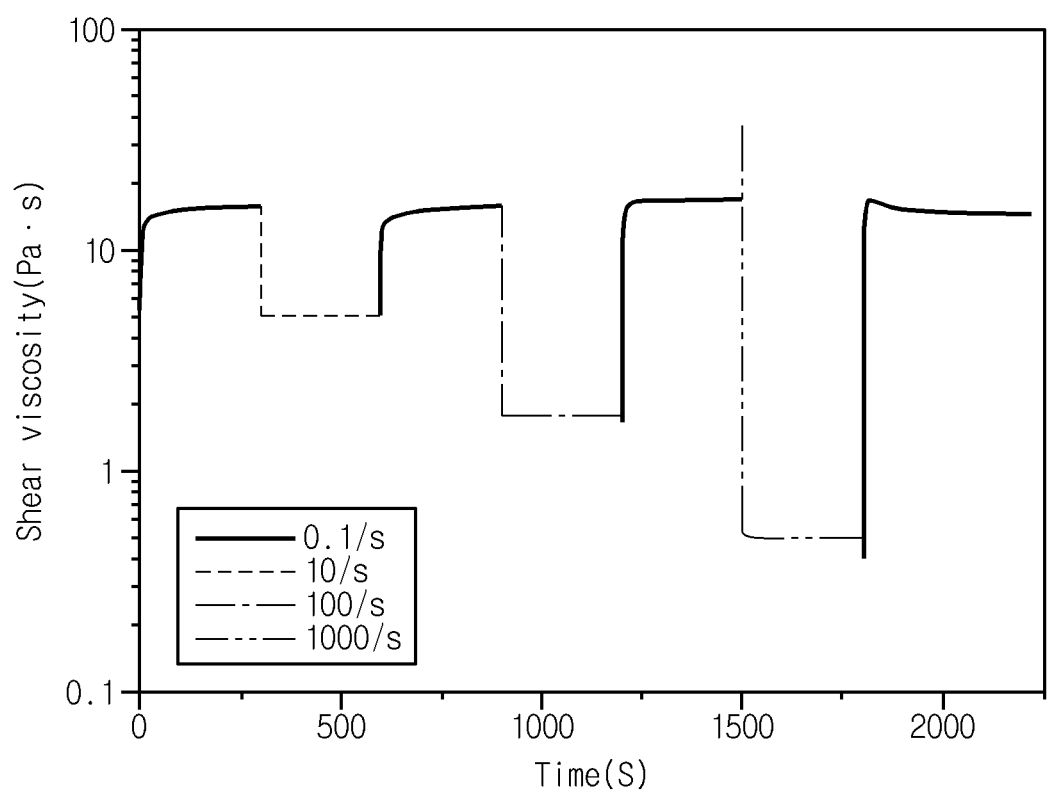
FIG. 4a and FIG. 4b are time vs. shear viscosity graphs illustrating the evaluation results of physical properties of negative electrode mixture slurry according to an embodiment of the present disclosure.

According to a preferred embodiment as shown in FIG. 4a, the shear rate is changed according to 0.1/s→10/s→0.1/s 100/s→0.1/s→1,000/s, and the retention time of each shear rate is set to 180-260 seconds. In this case, when the shear viscosity at the second 0.1/s or the third 0.1/s is recovered to a level of a shear viscosity within ±20% of the shear viscosity at the first 0.1/s, it can be predicted that the electrode mixture slurry does not undergo filter blocking or phase instability while it passes through a transfer tube or coating line.

Figure 4B:
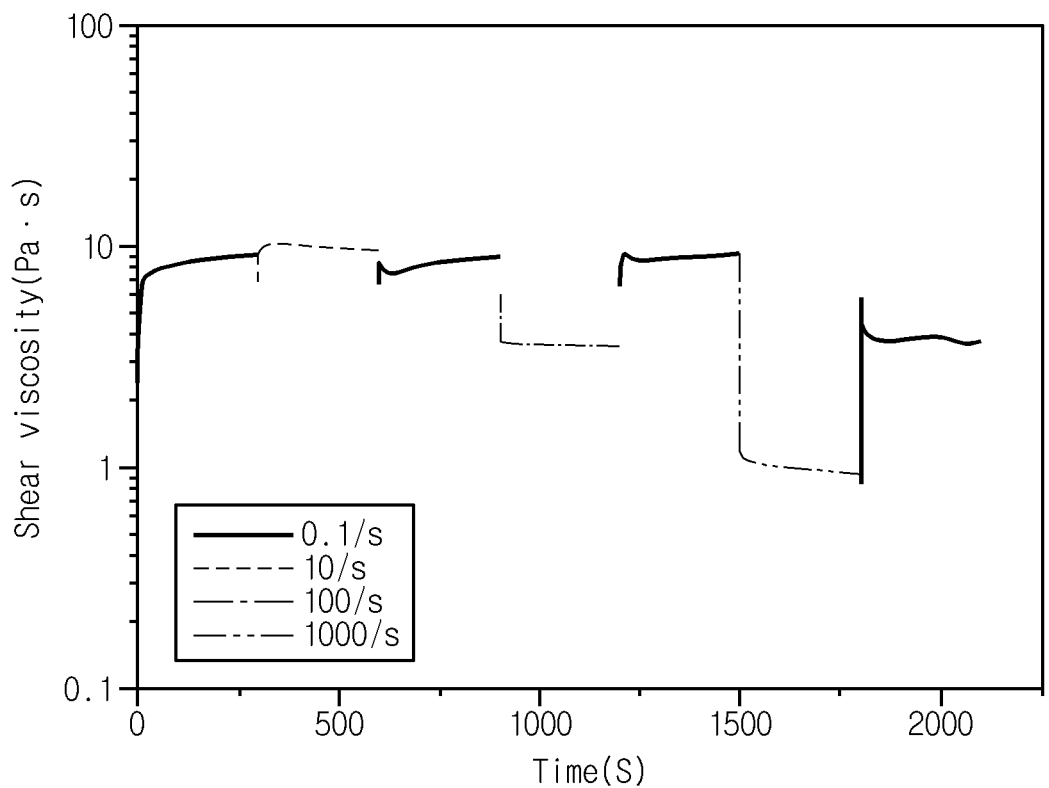

However, as shown in FIG. 4b, when the shear viscosity at 0.1/s as shown in the red circle is not recovered to a level of the shear viscosity at the first 0.1/s, it can be predicted that the electrode slurry undergoes filter blocking or has abnormal phase stability.

Since the shear viscosity is measured while the shear rate is changed instantaneously according to the present disclosure, it is possible to significantly reduce the time required for evaluating phase stability of electrode mixture slurry, unlike the method for measuring shear viscosity while changing the shear rate gradually according to the related art. For example, it is possible to evaluate phase stability of electrode mixture within about 20 minutes according to the present disclosure.

The apparatus used for evaluating electrode mixture slurry according to the present disclosure is characterized in that it is designed to simulate a shear condition applied to a transfer tube and transfer and/or circulation filter so that physical properties of electrode mixture slurry may be evaluated substantially.

Figure 5:
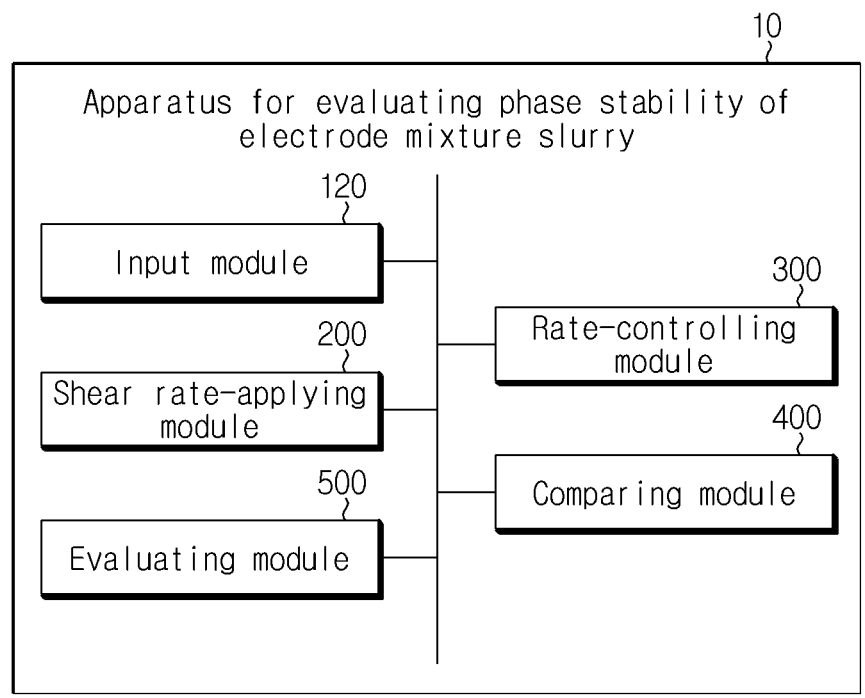
FIG. 5 is a schematic view illustrating the apparatus for evaluating phase stability of electrode mixture slurry according to the present disclosure.

According to an embodiment of the present disclosure, there is provided an apparatus for evaluating phase stability of electrode mixture slurry. As shown in FIG. 5, the apparatus 10 for evaluating phase stability of electrode mixture slurry includes: an input module 100 configured to introduce electrode mixture slurry to a rheometer; a shear rate applying module 200 configured to apply a first shear rate, a second shear rate and a third shear rate to the electrode mixture slurry; a rate-controlling module 300 configured to control the first shear rate, the second shear rate and the third shear rate in such a manner that a step of applying the second shear rate may be carried out after carrying out the step of applying the first shear rate, wherein the second shear rate is higher than the first shear rate, and a step of applying the third shear rate may be carried out after carrying out a step of applying the second shear rate, wherein the third shear rate is equal to the first shear rate; a comparing module 400 configured to compare the shear viscosity at the first shear rate with the shear viscosity at the third shear rate; and an evaluating module 500 configured to evaluate the electrode mixture slurry as one having phase stability, when the shear viscosity after carrying out the step of applying the third shear rate is within ±20% of the shear viscosity after carrying out the step of applying the first shear rate.

According to an embodiment of the present disclosure, the third shear rate may be substantially the same as the first shear rate.

The rheometer may be a rotational rheometer and a concentric cylinder may be used as a partial component thereof. For example, the rheometer may include Discovery HR available from TA instruments Korea.

The electrode mixture slurry used in the present disclosure may be positive electrode mixture slurry or negative electrode mixture slurry, and negative electrode mixture slurry is more preferred since it requires more improvement in filter blocking.

The electrode mixture slurry that may be used in the present disclosure is not particularly limited. For example, the electrode mixture slurry described hereinafter and a secondary battery including the same may be considered.

The ratio of electrode active material in the total solid content of electrode mixture slurry is suitably about 50 wt % or more and is preferably about 80-95 wt %. The ratio of conductive material in the total solid content may be about 0.1-20 wt %, preferably about 2-10 wt %, and more preferably about 3-5 wt %. When a binder is used, the ratio of binder in the total solid content of electrode mixture slurry may be about 0.5-10 wt %, preferably about 1-5 wt %.

A positive electrode is obtained by applying positive electrode mixture slurry which is a mixture of a positive electrode active material, polar solvent, conductive material and a binder onto a positive electrode current collector, followed by drying. If desired, the mixture may further include a filler.

The positive electrode active material may include a compound represented by the following Chemical Formula 1, Chemical Formula 2, Chemical Formula 3 or Chemical Formula 4, or a combination thereof. In addition to the above-mentioned compounds, the positive electrode active material may include, but is not limited to: lithium manganese oxides, such as $LiMnO_3$ and $LiMn_2O_3$; lithium copper oxide ($Li_2CuO_2$); vanadium oxides, such as $LiV_3O_8$, $LiV_3O_4$, $V_2O_5$ and $Cu_2V_2O_7$; lithium manganese composite oxides represented by $Li_2Mn_3MO_8$ (wherein M=Fe, Co, Ni, Cu or Zn); disulfide compounds; $Fe_2(MoO_4)$; or the like.

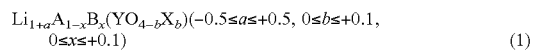

$$Li_{1+a}A_{1-x}B_x(YO_{4-b}X_b)(-0.5 \le a \le +0.5, 0 \le b \le +0.1, 0 \le x \le +0.1) \quad (1)$$

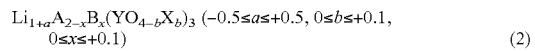

$$Li_{1+a}A_{2-x}B_x(YO_{4-b}X_b)_3 (-0.5 \le a \le +0.5, 0 \le b \le +0.1, 0 \le x \le +0.1) \quad (2)$$

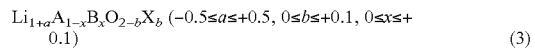

$$Li_{1+a}A_{1-x}B_xO_{2-b}X_b (-0.5 \le a \le +0.5, 0 \le b \le +0.1, 0 \le x \le +0.1) \quad (3)$$

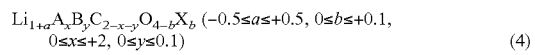

$$Li_{1+a}A_xB_yC_{2-x-y}O_{4-b}X_b (-0.5 \le a \le +0.5, 0 \le b \le +0.1, 0 \le x \le +2, 0 \le y \le 0.1) \quad (4)$$

In the above Chemical Formulae, A is at least one element selected from transition metals having a hexa-dentate structure;

B is at least one element selected from alkaline earth metals and Group 3B elements;

C and Y are at least one element selected from transition metals having a tetra-dentate structure; and X is at least one element selected from Group 5B, 6B and 7B elements.

In general, the positive electrode current collector is formed to have a thickness of 3-500 μm. The positive electrode current collector is not particularly limited, as long as it causes no chemical change in the corresponding battery and has high conductivity. Particular examples of the positive electrode current collector may include stainless steel, aluminum, nickel, titanium, baked carbon, aluminum or stainless steel surface-treated with carbon, nickel, titanium or silver, or the like. In addition, fine surface irregularities may be formed on the surface of the positive electrode current collector to increase the adhesion of the positive electrode active material. The positive electrode current collector may have various shapes, such as a film, sheet, foil, net, porous body, foamed body, non-woven body, or the like.

The conductive material is added generally in an amount of 1-50 wt % based on the total weight of the mixture including the positive electrode active material. The conductive material is not particularly limited, as long as it causes no chemical change in the corresponding battery and has conductivity. Particular examples of the conductive material include: graphite, such as natural graphite or artificial graphite; carbon black, such as carbon black, acetylene black, Ketjen black, channel black, furnace black, lamp black or thermal black; conductive fibers, such as carbon fibers or metallic fibers; fluorocarbon; metal powder such as aluminum or nickel powder; conductive whisker, such as zinc oxide or potassium titanate; conductive metal oxide, such as titanium oxide; and conductive materials, such as polyphenylene derivatives.

The binder is an ingredient which assists binding between the electrode active material and the conductive material and binding to the positive electrode current collector. In general, the binder is added in an amount of 1-50 wt % based on the total weight of the mixture including the positive electrode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butyrene rubber, fluororubber, various copolymers, or the like.

The filler is an ingredient inhibiting swelling of the positive electrode and is used optionally. The filler is not particularly limited, as long as it causes no chemical change in the corresponding battery and is a fibrous material. Particular examples of the filler include olefinic polymers, such as polyethylene or polypropylene; and fibrous materials, such as glass fibers or carbon fibers.

The negative electrode is obtained by applying a negative electrode mixture including a negative electrode active material onto a negative electrode current collector, followed by drying and pressing. If desired, the negative electrode mixture may further optionally include the above-mentioned conductive material, binder, filler, or the like.

Particular examples of the negative electrode active material include: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; metal oxides, such as $AuO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like.

In general, the negative electrode current collector is formed to have a thickness of 3-500 μm. The negative electrode current collector is not particularly limited, as long as it causes no chemical change in the corresponding battery and has conductivity. Particular examples of the negative electrode current collector may include copper, stainless steel, aluminum, nickel, titanium, baked carbon, copper or stainless steel surface-treated with carbon, nickel, titanium or silver, or the like. In addition, similarly to the positive electrode current collector, it is possible to increase the adhesion of a negative electrode active material by forming fine surface irregularities on the surface of a negative electrode current collector. The negative electrode current collector may have various shapes, such as a film, sheet, foil, net, porous body, foamed body and a non-woven web body.

The separator is interposed between the positive electrode and the negative electrode. An insulating thin film having high ion permeability and mechanical strength is used as the separator. The separator generally has a pore diameter of 0.01-10 μm and a thickness of 5-300 μm. Particular examples of the separator include, but are not limited to: porous polymer substrates sheets made of polypropylene having chemical resistance and hydrophobic property, or the like; sheets or non-woven webs made of glass fibers or polyethylene, or the like; or composite separators including a porous polymer substrate and a mixture of inorganic particles with a binder polymer coated on at least one surface of the porous polymer substrate. When a solid electrolyte, such as a polymer, is used as electrolyte, the solid electrolyte may also function as a separator.

The lithium salt-containing non-aqueous electrolyte includes a non-aqueous electrolyte and a lithium salt, and the non-aqueous electrolyte includes a non-aqueous organic solvent, organic solid electrolyte, inorganic solid electrolyte, or the like, but is not limited thereto.

Particular examples of the non-aqueous organic solvent include aprotic solvents, such as N-methyl-2-pyrrolidone, propylene carbonate, ethylene carbonate, butylene carbonate, dimethyl carbonate, diethyl carbonate, γ-butyrolactone, 1,2-dimethoxyethane, tetrahydrofuran, 2-methyl tetrahydrofuran, dimethyl sulfoxide, 1,3-dioxolan, formamide, dimethyl formamide, dioxolan, acetonitrile, nitromethane, methyl formate, methyl acetate, triphosphate, trimethoxymethane, dioxolan derivatives, methyl sulforane, 1,3-dimethyl-2-imidazolidione, propylene carbonate derivatives, tetrahydrofuran derivatives, ethers, methyl propionate, ethyl propionate, or the like.

Particular examples of the organic solid electrolyte may include polyethylene derivatives, polyethylene oxide derivatives, polypropylene oxide derivatives, phosphate polymer, polyalginate lysine, polyester sulfide, polyvinyl alcohol, polyvinylidene fluoride, polymers containing an ionically dissociatable group, or the like.

Particular examples of the inorganic solid electrolyte may include nitrides, halides and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material which can be dissolved in the non-aqueous electrolyte with ease, and particular examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lithium lower aliphatic carboxylate, lithium tetraphenyl borate, lithium imide, or the like.

In addition, the lithium salt-containing non-aqueous electrolyte may further include pyridine, triethyl phosphite, triethanolamine, cyclic ethers, ethylene diamine, n-glyme, triamide hexamethylphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethaol and aluminum trichloride in order to improve the charge/discharge characteristics, flame resistance, or the like. Optionally, the electrolyte may further include a halogen-containing solvent, such as carbon tetrachloride or trifluoroethylene, in order to impart non-combustibility. The electrolyte may further include carbon dioxide gas in order to improve the high-temperature storage characteristics. In addition, the electrolyte may further include fluoro-ethylene carbonate (FEC), propene sultone (PRS), or the like.

According to an embodiment, it is possible to prepare a lithium salt-containing non-aqueous electrolyte by adding a lithium salt, such as LiPF$_6$, LiClO$_4$, LiBF$_4$ or LiN(SO$_2$CF$_3$)$_2$ to a mixed solvent containing a cyclic carbonate, such as EC or PC, as a solvent having high dielectric property in combination with a linear carbonate, such as DEC, DMC or EMC, as a solvent having low viscosity.

In still another aspect, there is provided a battery pack including the lithium secondary battery as a unit cell, and the battery pack may be used as a power source for devices.

Preferred examples of the devices include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

MODE FOR DISCLOSURE

Hereinafter, the present disclosure will be explained in detail with reference to Examples. However, the scope of the present disclosure is not limited to the exemplary embodiments set forth therein.

Preparation Example 1: Preparation of Negative Electrode Mixture Slurry Having High Phase Stability First, 96 parts by weight of artificial graphite as a negative electrode active material and 0.5 parts by weight of carbon black as a conductive material were mixed with 100 parts by weight of water (before introduction of styrene butadiene rubber (SBR)). Then, 3.5 parts by weight of SBR and carboxymethyl cellulose were introduced thereto as binders to obtain negative electrode mixture slurry (after introduction of SBR).

Preparation Example 2: Preparation of Negative Electrode Mixture Slurry Having Low Phase Stability Negative electrode mixture slurry was obtained in the same manner as Preparation Example 1, except that a different type of artificial graphite was used as a negative electrode material to reduce phase stability while using the same composition of styrene-butadiene rubber, carboxymethyl cellulose and other ingredients.

Comparative Example 1

The shear viscosity of the slurry obtained from Preparation Example 1 was measured before and after introduction of SBR at a shear rate of 1/s by using a rheometer (DHR2 available from TA instrument). The results are shown in FIG. 2a. After measuring the shear viscosity, there was little difference in viscosity depending on the number of shear cycles. Thus, it is thought that the slurry has phase stability. It took about 1 hour to measure the shear viscosity.

Comparative Example 2

The shear viscosity of the slurry obtained from Preparation Example 2 was measured before and after introduction of SBR at a shear rate of 1/s by using a rheometer (DHR2 available from TA instrument). The results are shown in FIG. 2b. After measuring the shear viscosity, a difference in viscosity was generated depending on the number of shear cycles. Thus, it is thought that the slurry phase is not stable. It took about 1 hour to measure the shear viscosity.

Example 1

The shear viscosity of the slurry obtained from Preparation Example 1 was measured by using a rheometer (DHR2 available from TA instrument) and changing the shear rate according to 0.1/s→10/s→0.1/s→100/s→0.1/s→1,000/s, while setting the retention time of each shear rate to 180 seconds. The results are shown in FIG. 4a. After the measurement, the shear viscosity at the second 0.1/s or the third 0.1/s was recovered to a level oft 20% of the shear viscosity at the first 0.1/s. Thus, it is thought that the slurry according to Preparation Example 1 has phase stability. It took about 20 minutes to measure the shear viscosity.

Example 2

The shear viscosity was measured in the same manner as Example 1, except that the slurry obtained from Preparation Example 2 was used. The results are shown in FIG. 4b. After the measurement, the shear viscosity at the second 0.1/s or the third 0.1/s was not recovered to a level of ±20% of the shear viscosity at the first 0.1/s. Thus, it is thought that the slurry according to Preparation Example 2 has no phase stability. It took about 20 minutes to measure the shear viscosity.

What is claimed is:

1. A method for evaluating phase stability of an electrode mixture slurry, comprising the steps of:
 (S1) introducing the electrode mixture slurry to a rheometer;
 (S2) applying a first shear rate to the electrode mixture slurry;
 (S3) applying a second shear rate after applying the first shear rate to the electrode mixture slurry, wherein the second shear rate is higher than the first shear rate;
 (S4) applying a third shear rate after applying the second shear rate to the electrode mixture slurry, wherein the third shear rate is equal to the first shear rate; and
 (S5) comparing a shear viscosity at the first shear rate with a shear viscosity at the third shear rate, wherein an approximately instantaneous rate of change in shear rate from the step of applying the first shear rate to the step of applying the second shear rate, or from the step of applying the second shear rate to the step of applying the third shear rate has an absolute value of $100/s^2$ or more.

2. The method for evaluating phase stability of the electrode mixture slurry according to claim 1, which further comprises at least one step of further applying a fourth shear rate that is higher than the third shear rate to the electrode mixture slurry, after applying the third shear rate.

3. The method for evaluating phase stability of the electrode mixture slurry according to claim 2, wherein the step of further applying the fourth shear rate is carried out at least twice, and the method further comprises a step of applying the same shear rate as the first shear rate between the steps of further applying the fourth shear rate.

4. The method for evaluating phase stability of the electrode mixture slurry according to claim 2, wherein the fourth shear rate is about 10 times or more higher than the second shear rate.

5. The method for evaluating phase stability of the electrode mixture slurry according to claim 2, wherein a retention time of each of the step of applying the first shear rate, the step of applying the second shear rate, the step of applying the third shear rate and the step of applying the fourth shear rate is 180 seconds to 260 seconds.

6. The method for evaluating phase stability of the electrode mixture slurry according to claim 1, wherein each of the first shear rate and the third shear rate is about 0.1/s.

7. The method for evaluating phase stability of the electrode mixture slurry according to claim 1, wherein the rheometer is a rotational rheometer.

8. The method for evaluating phase stability of the electrode mixture slurry according to claim 1, wherein the step of introducing the electrode mixture slurry is carried out by introducing 10 mL of electrode mixture slurry.

9. The method for evaluating phase stability of the electrode mixture slurry according to claim 1, which further comprises a step of evaluating the electrode mixture slurry as having phase stability, when the shear viscosity after carrying out the step of applying the third shear rate is within ±20% of the shear viscosity after carrying out the step of applying the first shear rate, as a result of the comparison of shear viscosity in the step of comparing shear viscosities.

10. An apparatus for evaluating phase stability of an electrode mixture slurry, comprising:

an input module configured to introduce the electrode mixture slurry to a rheometer;

a shear rate applying module configured to apply a first shear rate, a second shear rate and a third shear rate to the electrode mixture slurry;

a rate-controlling module configured to control the first shear rate, the second shear rate and the third shear rate when applying the second shear rate is carried out after carrying out a step of applying the first shear rate, wherein the second shear rate is higher than the first shear rate, and a step of applying the third shear rate is carried out after carrying out a step of applying the second shear rate, wherein the third shear rate is equal to the first shear rate, wherein an approximately instantaneous rate of change in shear rate from applying the first shear rate to applying the second shear rate, from applying the second shear rate to applying the third shear rate, or from applying the third shear rate to further applying a fourth shear rate has an absolute value of $100/s^2$ or more;

a comparing module configured to compare the shear viscosity at the first shear rate with the shear viscosity at the third shear rate; and an evaluating module configured to evaluate the electrode mixture slurry as having phase stability, when the shear viscosity after carrying out the step of applying the third shear rate is within ±20% of the shear viscosity after carrying out the step of applying the first shear rate.

\* \* \* \* \*